United States Patent
Avedikian et al.

(10) Patent No.: US 7,943,541 B2
(45) Date of Patent: May 17, 2011

(54) SINTERED REFRACTORY PRODUCT EXHIBITING ENHANCED THERMAL SHOCK RESISTANCE

(75) Inventors: Richard Avedikian, Robion (FR); Michel Bobo, Saint-Saturnin les Avignon (FR); Thibault Champion, Cheval Blanc (FR); Christian His, Cavaillon (FR)

(73) Assignee: Saint Gobain Centre de Recherches et d'Etudes Europeen, Courbevoie (FR)

( * ) Notice: Subject to any disclaimer, the term of this patent is extended or adjusted under 35 U.S.C. 154(b) by 199 days.

(21) Appl. No.: 12/067,810

(22) PCT Filed: Sep. 25, 2006

(86) PCT No.: PCT/FR2006/002180
§ 371 (c)(1),
(2), (4) Date: Jun. 3, 2008

(87) PCT Pub. No.: WO2007/034092
PCT Pub. Date: Mar. 29, 2007

(65) Prior Publication Data
US 2009/0221415 A1    Sep. 3, 2009

(30) Foreign Application Priority Data
Sep. 26, 2005 (FR) .................................... 05 09814

(51) Int. Cl.
*C04B 35/185* (2006.01)
*C04B 35/482* (2006.01)

(52) U.S. Cl. ........................................ 501/105; 501/107
(58) Field of Classification Search .................. 501/105, 501/107
See application file for complete search history.

(56) References Cited

U.S. PATENT DOCUMENTS

| | | | |
|---|---|---|---|
| 4,290,814 A | 9/1981 | Pavlica et al. | |
| 4,585,485 A | 4/1986 | Shikano et al. | |
| 4,646,950 A | 3/1987 | Gotoh et al. | |
| 5,053,366 A | 10/1991 | Schoennahl | |
| 6,509,287 B2 * | 1/2003 | Boussant-Roux et al. | 501/105 |
| 7,074,733 B2 * | 7/2006 | Guigonis et al. | 501/95.1 |
| 2009/0062106 A1 * | 3/2009 | Avedikian et al. | 501/105 |

FOREIGN PATENT DOCUMENTS

| | | |
|---|---|---|
| EP | 0 404 610 B1 | 12/1990 |
| FR | 2 552 756 | 4/1985 |
| GB | 2 147 287 A | 5/1985 |
| JP | 6-80477 A | 3/1994 |
| JP | 2002-220290 A | 8/2002 |
| RU | 2 196 118 | 1/2003 |
| WO | 03043953 * | 3/2003 |

* cited by examiner

*Primary Examiner* — Karl E Group
(74) *Attorney, Agent, or Firm* — Young & Thompson

(57) ABSTRACT

The invention concerns a sintered refractory product having the following average chemical composition, in weight percentages based on oxides: $20\% < Al_2O_3 < 90\%$; $6\% = SiO_2 < 30\%$; $3\% < ZrO_2 < 50\%$; $0\% = Cr_2O_3 < 50\%$. The inventive product is characterized in that it comprises 17 to 85 wt. % of mullite-zirconium grains.

23 Claims, No Drawings

SINTERED REFRACTORY PRODUCT EXHIBITING ENHANCED THERMAL SHOCK RESISTANCE

BACKGROUND OF THE INVENTION

1. Field of the Invention

The invention relates to novel sintered refractory products exhibiting enhanced thermal shock resistance.

2. Description of the Related Art

Among refractory products, fused-cast products and sintered products may be distinguished.

Contrary to sintered products, fused-cast products most often have an intergranular glassy phase linking the crystallized grains. The problems posed by sintered products and fused-cast products and the technical solutions for solving them are thus generally different. A mixture developed for manufacturing a fused-cast product therefore is not a priori usable as such for manufacturing a sintered product and vice versa.

Sintered products, depending on their chemical composition and mode of preparation, are intended to be used in a wide variety of industrial applications.

Examples of sintered products include, in particular, alumina-zirconia-silica products, usually referred to as AZS, as well as so-called aluminous products, which are used, in particular, in certain regions of glassmaking furnaces.

Products such are those described in patent FR 2 552 756 in the name of Emhart Industries are generally appropriate for such an application. Products such as BPAL, ZA33 or ZIRAL, which are manufactured and marketed by Saint-Gobain SefPro are also particularly well suited and presently widely used in certain regions of glassmaking furnaces.

Also known from EP 0 404 610 are refractory mixtures containing monoclinic zirconia, from which products exhibiting outstanding thermal shock resistance can be obtained.

However, glass or energy producing industries need refractory products exhibiting ever greater levels of performance.

SUMMARY OF THE INVENTION

The object of the present invention is therefore to provide a refractory product exhibiting enhanced thermal shock resistance and hot mechanical strength, corrosion resistance and porosity properties similar to or better than those of presently used refractory products.

According to the invention, this object is achieved by means of a sintered refractory product having the following average chemical composition, the percentages being by weight on the basis of the oxides:

20%<$Al_2O_3$<90%
2%<$SiO_2$<30%
3%<$ZrO_2$<50%
0%=$Cr_2O_3$<50%, which is characterized in that it comprises, as a percentage by weight on the basis of the oxides, 17 to 85% of mullite-zirconia grains.

DETAILED DESCRIPTION OF THE INVENTION

As shown below, the sintered refractory product of the invention exhibits surprisingly enhanced thermal shock resistance.

Preferably, the product according to the invention also has one or more of the optional following characteristics:

The sum of $Al_2O_3$, $SiO_2$, $ZrO_2$ and $Cr_2O_3$ contents, as percentages by weight on the basis of the oxides, is 94% or more, preferably 98% or more. It is considered that, under these conditions, the presence of the other oxides does not substantially modify the obtained results.

The product according to the invention contains, as percentages by weight on the basis of the oxides, more than 19%, preferably more than 24%, even more preferably more than 30% and/or less than 60%, and preferably less than 50% of mullite-zirconia grains.

The product according to the invention contains, as percentages by weight on the basis of the oxides, at least 10% and/or at most 33% of $ZrO_2$.

The product according to the invention contains, as percentages by weight on the basis of the oxides, at least 6% and/or at most 18% of $SiO_2$.

The product according to the invention contains, as percentages by weight on the basis of the oxides, at least 50% and/or at most 80% of $Al_2O_3$.

The product according to the invention includes more than 99%, preferably substantially 100%, by weight, of oxides. For that purpose, preferably, all of the raw materials used in the starting charge are oxides, except for the additions required for the shaping phase.

In one embodiment, the product according to the invention preferably contains less than 0.5% of $Cr_2O_3$, and preferably contains no, or only trace amounts of, $Cr_2O_3$. This is because this oxide is an undesirable impurity in some applications, in particular when the block according to the invention is in contact with certain molten glasses. Specifically, it can result in a reduction of the molten glass quality due to bubbling or staining phenomena.

Both the starting charge and the product according to the invention contain no metal silicon, at least if the product according to the invention is intended to be used in glassmaking applications, since metal silicon is incompatible with such applications. For the same reason, the product according to the invention preferably contains no metal fibers.

The grain size of mullite-zirconia lies in the range 0 to 3 mm.

The product according to the invention preferably contains, as percentages by weight on the basis of the oxides, at least 3%, preferably at least 4% and more preferably, less than 22%, preferably less than 10%, and preferably less than 6%, of mullite-zirconia grains having a size of 0.7 mm or less.

The product according to the invention preferably contains, as a percentage by weight on the basis of the oxides, at least 1%, preferably at least 1.5%, of mullite-zirconia grains having a size of 0.3 mm or less. This results in a substantial improvement in thermal shock resistance.

The product according to the invention contains less than 1% by weight of MgO, on the basis of the oxides, and preferably contains no MgO, except in the form of impurities, i.e. in amounts smaller than 0.5% and preferably less than 0.2%.

The product according to the invention is already sintered before being placed in its operational position or installed, i.e. it is not sintered in situ.

The invention also relates to the use of a refractory product according to the invention such as a shaped refractory part for shaping molten glass to be used as a consumable layer or a refractory lining, in particular in the combustion chamber of an industrial facility.

By "mullite-zirconia grain" is meant a refractory grain produced by sintering or fusing having a chemical composition containing, as its major constituents, alumina ($Al_2O_3$), silica ($SiO_2$) and zirconia ($ZrO_2$), wherein silica and alumina are present in the form of 2 $SiO_2$-3 $Al_2O_3$ (mullite). Alumina ($Al_2O_3$), silica ($SiO_2$) and zirconia ($ZrO_2$) thus are the three main constituents, by weight, of a mullite-zirconia grain.

The "size of a grain" refers to its largest dimension. It is considered that, by definition, a "grain" has a size of less than 4 mm.

For manufacturing a refractory product according to the invention in the form of a sintered block, i.e. of a shaped part sintered before it is placed in its operational position, a manufacturing process comprising the following consecutive steps can be performed:

a) preparing a starting charge;
b) casting said charge in a mold or compacting it by vibrating and/or pressing and/or tamping said charge within the mold to form a preform;
c) removing said preform from the mold;
d) drying said preform, preferably in air or a moisture-controlled atmosphere so that the residual moisture in the preform remains between 0 and 0.5%;
e) firing said preform in an oxidizing atmosphere at a temperature in the range 1300 to 1800° C. to form a sintered refractory block according to the invention.

Steps a) to e) are steps conventionally carried out for the manufacture of sintered products.

In step a), the starting charge is made of a variety of raw materials, the chemical composition and granulometric distribution of which may vary. According to the invention, it contains, the percentages being by weight on the basis of the refractory oxides, 17 to 85% of mullite-zirconia grains, as well as any refractory material allowing the desired overall composition to be achieved, such as tabular alumina, electrofused corundum, zircon, chromium oxide, in particular sintered in the form of chamotte, electrofused materials, such as those based on $Al_2O_3$—$ZrO_2$—$SiO_2$, alumina, fumed silica, monoclinic and/or stabilized zirconia, chromium oxide pigment, and the like.

The starting charge is determined so that the product obtained after step e) conforms to the invention and further exhibits one or preferably several of the preferred characteristics of the product according to the invention.

The starting charge preferably contains, as a percentage by weight on the basis of the oxides, at least 1%, preferably at least 1.5% of mullite-zirconia grains having a size of 0.3 mm or less. These grains may be added in any appropriate granulometric class, such as, without any limitation thereto, 0-0.7 mm, 0-0.3 mm or 0-0.15 mm.

The starting charge may also contain one or more additives in a particulate form so as to provide the starting charge with sufficient plasticity during the shaping step b) and for providing the preform obtained at the end of step d) with sufficient mechanical strength. The amounts of additives are non-limiting. In particular, the amounts conventionally used in known sintering processes are appropriate.

Certain oxides may be introduced via the additives.
Non-limiting examples of usable additives include:
temporary organic binders (i.e. entirely or partially eliminated during the drying and firing steps) such as resins, cellulose or lignone derivatives, such as carboxymethylcellulose, dextrin, polyvinyl alcohols, and the like. Preferably, the amount of temporary binder is in the range 0.1% to 6% by weight relative to the particulate oxide mixture in the starting charge;
chemical binders such as phosphoric acid, aluminum monophosphate, and the like;
hydraulic binders, such as aluminous cements, for instance SECAR 71 or of the CaO aluminate type;
deflocculants, such as alkaline metal polyphosphates or methacrylate derivatives;
sintering promoters such as titanium dioxide (in a proportion not exceeding approximately 2% of the weight of the composition) or magnesium hydroxide;
shaping aids such as magnesium or calcium stearates;
clay-based additions to facilitate utilisation and aid sintering.

These additions introduce alumina and silica and a few alkali or alkaline earth metal oxides, or even iron oxide, according to the type of clay.

In cases where the refractory mixture contains a chemical or hydraulic binder, it is then a concrete, which, for example, may be used in practice via vibration casting.

Preferably, the starting charge contains less than 1% MgO, by weight on the basis of the oxides, and more preferably, contains no MgO, except in the form of impurities, i.e. in amounts of 0.5% or less, preferably less than 0.2%. The process is thus made simpler.

In order to obtain a refractory product according to the invention at the end of step e), the starting charge exhibits the following average chemical composition, as percentages by weight on the basis of the refractory oxides:

20%<$Al_2O_3$<90%
2%<$SiO_2$<30%
3%<$ZrO_2$<50%
0%=$Cr_2O_3$<50% and comprises 17 to 85% of mullite-zirconia grains, the percentages being by weight on the basis of refractory oxides.

Water is also conventionally added to the starting charge.
The mixture of the various starting charge constituents is continued until a substantially homogeneous starting charge is obtained.

In step b), the charge is shaped and placed in a mold.
In case the shaping is performed by pressing, a specific pressure of 400 to 800 kg/cm$^2$ is appropriate for a non-plastic paste. Pressing is preferably carried out uniaxally or isostatically, for example using a hydraulic press. It may advantageously be preceded by a manual or pneumatic and/or vibrational ramming operation.

Drying in step d) can be carried out at a moderately high temperature. Preferably, it is carried out at a temperature in the range of room temperature to 200° C. It conventionally lasts between 10 hours and one week, depending on the format of the preform, until the residual moisture content of the preform is less than 0.5%.

The dried preform is then fired (step e)) in order to sinter it. The sintering operation is well known to those skilled in the art. Sintering corresponds to a thermal consolidation of the material. It is generally accompanied by a decrease in porosity and by a dimensional shrinkage.

The sintering temperature depends on the starting mixture composition, but a temperature between 1300 and 1800° C. is appropriate in most cases. Sintering is preferably carried out in an oxidizing atmosphere, and more preferably in air, preferably at atmospheric pressure. The firing period, between about 1 and 15 days cold to cold, depends on the materials and also on the size and shape of the refractory products to be manufactured.

Step e) transforms the preform into a refractory product according to the invention, which is particularly useful as a shaped refractory part used for shaping molten glass or as a refractory tile in the combustion chamber of an industrial facility.

Conventionally, the preform is fired in a firing furnace.
As opposed to products sintered in situ, i.e. sintered after having been placed in their operational position, for example after having been projected onto a wall to be protected, the block according to the invention results from a sintering within a firing furnace, so that each of its sides is heated in substantially the same manner, before being placed in its operational position. Therefore, this prevents any dependence of the temperature gradient on the position of a given point on the outer surface of the block. As opposed to in situ sintered products, the product according to the invention thus exhibits a homogeneous density and microstructure throughout, thus resulting in improved resistance to thermal shock, to corrosion by water vapor, and to corrosion by molten glass.

The refractory products according to the invention may then be used directly or after having been assembled by means of appropriate expansion joints, according to techniques well known to those skilled in the art.

The way the amounts of constituents are determined in the refractory product is well known to a person skilled in the art. In particular, a person skilled in the art is aware that the mullite-zirconia grains as well as the oxides $Al_2O_3$, $SiO_2$, $ZrO_2$ and $Cr_2O_3$ present in the starting charge are also found in the sintered refractory product. For the same quantity of constituents in the sintered refractory product, the starting charge composition may however change, depending on those quantities and on the nature of the additives present in said charge.

To further illustrate the invention, the following non-limiting examples are given.

In these examples, the raw materials employed were chosen from:
  fused mullite-zirconia grains containing more than 99% of $ZrO_2+Al_2O_3+SiO_2$ and 35% of zirconia mainly in monoclinic form, having a size in the range 0 to 3 mm;
  grains having a size in the range 0 to 20 mm, obtained by grinding electrofused refractory products such as ER-1681 or ER-1711, which are produced and marketed by Société Européenne des Produits Réfractaires. These products contain, as percentages by weight on the basis of the oxides, 32 to 54% of $ZrO_2$, 36 to 51% of $Al_2O_3$, 2 to 16% of $SiO_2$ and 0.2 to 1.5% of $Na_2O$;
  tabular alumina grains containing more than 99% of alumina and having a size in the range 40 µm to 3.5 mm;
  fused or sintered mullite grains, for example a powder containing 76.5% of $Al_2O_3$ and 22.5% of $SiO_2$ and having a particle size in the range 0.7 to 3 mm;
  products having a high content of zirconia such as CS10 or CC10, marketed by Société Européenne des Produits Réfractaires. These products contain more than 99% of $ZrO_2$ and the median diameter (D50) of the zirconia particles is 3.5 µm;
  reactive alumina or a mixture of reactive aluminas, containing more than 99% of $Al_2O_3$, the median diameter of reactive alumina particles ranging from 0.5 µm to 3 µm;
  electrofused alumina having a particle size in the range 0.04 to 0.5 mm;
  fumed silica marketed by Société Européenne des Produits Réfractaires. This glassy silica contains more than 93% of silica ($SiO_2$) and is available in the form of a powder having a median particle size of up to 1 µm;
  a hydraulic concrete or a mixture of various cements; it is preferred to use a cement having a high alumina content, such as CA25 sold by Almatys. CA25 contains 78% of $Al_2O_3$ and 18% of CaO;
  zircon in sand form or in a thoroughly micronized form and containing 35% of silica;
  calcium carbonate $Na_2CO_3$;
  chromium oxide, $Cr_2O_3$, in pigment form, containing more than 99% of chromium 3 oxide and available in the form of a powder having a median size of 2 µm.

Sintered refractory blocks were manufactured according to the above-described process.

In step a), raw materials were metered in such a way that the starting charge had the desired average mineral chemical composition by weight, and then mixed in the presence of water and at least one dispersant, such as sodium phosphate.

The starting charge was then cast in a mold to form a green preform having sufficient mechanical strength to be manipulated. It was then dried for 12 hours at 110° C. The preform was finally sintered at a temperature of 1350° C. or 1630° C. so as to form a refractory block.

Samples were taken from the various block examples in order to prepare specimens in the form of 125×25×25 mm bars.

In order to measure thermal shock resistance properties, a standardized test known as PRE III. 26/PRE/R.5.1/78 was adopted. This test allows the thermal shock behaviour to be assessed using the relative loss of flexural strength (DELTA MOR) after one or more cycles, each consisting in heating the test specimen from room temperature (20° C.) up to a maximum temperature T of 1200° C., keeping the specimen at this temperature T for 30 minutes and then plunging the specimen into cold water.

The MOR is the modulus of rupture.

In the following tables, MOR20 corresponds to the MOR value of the sample at 20° C. before any thermal shock cycle, and MoRxcycle corresponds to the MOR value after "x" cycle(s) of thermal shock.

The compositions of the tested products as well as their characteristics are shown in Table 1.

TABLE 1

| | Mullite-zirconia grains (%) | Chemical composition (%) | | | | MOR20 (mPa) | MORxcycle (MPa)/DELTA MOR (% relative to MOR20) | |
|---|---|---|---|---|---|---|---|---|
| | | $Al_2O_3$ | $SiO_2$ | $ZrO_2$ | $Cr_2O_3$ | | x = 1 | x = 3 |
| 1* | 0 | 76.1 | 11.5 | 11.0 | / | 20.8 | 6.0/71% | 3.0/86% |
| 2* | 0 | 91.0 | 8.6 | 0 | / | 10.4 | 3.3/68% | 3.0/71% |
| 3* | 16 | 79.7 | 7.5 | 11.5 | / | 17.5 | 6.3/64% | 3.0/83% |
| 4 | 20 | 79.6 | 7.6 | 11.6 | / | 18.8 | 8.9/53% | 3.9/79% |
| 5 | 20 | 53.3 | 16.7 | 27.9 | / | 31.7 | 13.3/58% | NA |
| 6 | 25 | 78.4 | 7.9 | 12.3 | / | 21.2 | 11.0/48% | 5.8/72% |
| 7 | 25 | 75.9 | 9.8 | 12.4 | / | 20.4 | 11.4/44% | NA |
| 8 | 25 | 74.4 | 9.2 | 14.9 | / | 21.8 | 12.4/43% | NA |
| 9 | 25 | 67.1 | 11.7 | 19.8 | / | 20.9 | 11.9/43% | NA |
| 10 | 35 | 52.8 | 16.9 | 28.2 | / | 32.4 | 17.5/46% | NA |
| 11 | 35 | 80.7 | 6.0 | 12.8 | / | 8.0 | 6.9/14% | 5.2/35% |
| 12 | 35 | 76.7 | 6.0 | 16.6 | / | 13.9 | 11.8/15% | 8.6/38% |

TABLE 1-continued

| | Mullite-zirconia grains (%) | Chemical composition (%) | | | | MOR20 (mPa) | MORxcycle (MPa)/DELTA MOR (% relative to MOR20) | |
|---|---|---|---|---|---|---|---|---|
| | | Al$_2$O$_3$ | SiO$_2$ | ZrO$_2$ | Cr$_2$O$_3$ | | x = 1 | x = 3 |
| 13 | 45 | 71.4 | 7.7 | 20.2 | / | 13.9 | 11.8/15% | 8.6/38% |
| 14 | 45 | 71.4 | 7.7 | 20.4 | / | 14.1 | 10.6/33% | 9.0/37% |
| 15 | 45 | 75.3 | 7.7 | 16.4 | / | 11.2 | 8.0/28% | 5.6/50% |
| 16 | 45 | 73.4 | 7.7 | 18.4 | / | 12.0 | 8.6/28% | 5.7/52% |
| 17 | 45 | 70.4 | 7.7 | 21.4 | / | 11.7 | 7.8/33% | 6.1/48% |
| 18 | 48 | 51.9 | 15.6 | 31.3 | / | 18.5 | 12.4/33% | NA |
| 19 | 54 | 50.8 | 17.6 | 29.4 | / | 26.3 | 17.1/35% | NA |
| 20* | 0 | 87.0 | 0.4 | / | 12.0 | 33.2 | 1.5/95% | breaks/100% |
| 21 | 22 | 75.0 | 4.0 | 8.0 | 12.0 | 12.2 | 5.6/54% | 2.4/80% |

*Examples outside the scope of the invention

The results show that an amount of more than 17% of mullite-zirconia grains is required in the starting charge refractory mixture so as to obtain a significant improvement in thermal shock resistance.

This is because, beyond this limit, it may be noted that the loss of MOR is limited and/or the MOR value at 20° C. is larger.

Further, tests have been carried out in order to assess the thermal shock resistance after water vapor corrosion.

Thus, samples were previously maintained in a furnace under a constant water vapor flow rate. After this treatment, they underwent the aforementioned thermal shock resistance test. The results are listed in Table 2, where MORcve is the MOR value of samples after water vapor corrosion, before any thermal shock cycle.

TABLE 2

| Mullite-zirconia grains (%) | Chemical composition (%) | | | MOR20 (mPa) | MORcve (mPa) | MORxcycle (MPa/DELTA MOR (% relative to MORcve) |
|---|---|---|---|---|---|---|
| | Al$_2$O$_3$ | SiO$_2$ | ZrO$_2$ | | | x = 1 |
| 0 | 91.0 | 8.6 | 0 | 11.9 | 9.9/17% | 5.4/45% |
| 45 | 71.4 | 7.7 | 20.4 | 13.5 | 9.0/33% | 7.7/14% |

It is noted that the products according to the invention result in an enhancement of thermal shock resistance even after they have undergone water vapor corrosion.

Further, the products of examples 11 to 17 exhibit a molten glass corrosion resistance at least equivalent to that of the reference products.

The following Table 3 illustrates the benefit of the presence of grains having sizes smaller than 0.7 mm.

TABLE 3

| | Chemical composition (%) | | | | | Mullite-zirconia grains (%)* | Mullite-zirconia grains 0-0.7 mm (%)* | MOR20 (mPa) | MOR 1 cycle (MPa)/DELTA MOR (% relative to MOR20) |
|---|---|---|---|---|---|---|---|---|---|
| | Al$_2$O$_3$ | SiO$_2$ | ZrO$_2$ | MgO | Cr$_2$O$_3$ | | | | |
| A | 79.8 | 7.7 | 11.9 | <0.1 | / | 20 | 0 | 17.4 | 7.9/55% |
| B | 78.9 | 7.8 | 12.6 | <0.1 | / | 20 | 0 | 21 | 10/52% |
| C | 78.9 | 7.8 | 12.6 | <0.1 | / | 20 | 4 | 20.7 | 10.5/49% |
| D | 78.9 | 7.8 | 12.6 | <0.1 | / | 20 | 4 | 20.3 | 10.5/48% |
| E | 80.1 | 7.5 | 11.8 | <0.1 | / | 25 | 0 | 17.4 | 7.9/55% |
| F | 78.7 | 8 | 12.8 | <0.1 | / | 25 | 5 | 20.9 | 11/47% |

*the indicated percentages are by weight on the basis of the total composition weight.

Comparison of examples A, B, C and D demonstrates the positive effect of a fine granulometric range (0-0.7 mm) on the modulus of rupture after a thermal shock and on the delta MOR, in particular after quenching. Examples E and F confirm this observation, and a content of 5% of said granulometric range is preferred.

The used mullite-zirconia grain mixtures in the 0-0.7 mm range contain generally between 30 and 50% by weight of grains smaller than 0.3 mm. Thus, example F contains between 1.5 and 2.5% of mullite-zirconia grains relative to the total composition weight, with a size of less than 0.3 mm. Preferably, the product according to the invention also contains at least 1%, preferably at least 1.5%, of mullite-zirconia grains having a size of 0.3 mm or less, the percentages being by weight on the basis of the oxides.

Furthermore, other tests have shown that the beneficial effect of adding mullite-zirconia grains is not affected by the presence of at least 50% of Cr$_2$O$_3$ (see examples 20 and 21). Although not preferred, the product according to the invention therefore advantageously and surprisingly tolerates high contents of Cr$_2$O$_3$. Furthermore, adding Cr$_2$O$_3$ advantageously improves resistance to corrosion by molten glass.

Of course, the aforementioned embodiments are merely examples that may be modified, in particular by substituting technical equivalents while still remaining within the scope of the present invention.

The invention claimed is:

1. A refractory sintered product, in a form of a block, having a following average chemical composition, with percentages by weight being on a basis of oxides:
   20% <$Al_2O_3$ <90%
   2% <$SiO_2$ <30%
   3% <$ZrO_2$ <50%
   0% <$Cr_2O_3$ <0.5%
   the product containing 17 to 85% of mullite-zirconia grains, at least 1% of the mullite-zironia grains having a size of 0.3 mm or less.

2. The refractory product according to claim 1, which contains, as percentages by weight on the basis of the oxides, more than 19% and less than 60% of the mullite-zirconia grains.

3. The refractory product according to claim 1, which contains, as percentages by weight on the basis of the oxides, more than 24% and less than 50% of the mullite-zirconia grains.

4. The refractory product according to claim 1, which contains, as percentages by weight on the basis of the oxides, at least 10% and at most 33% of $ZrO_2$.

5. The refractory product according to claim 1, which contains, as percentages by weight on the basis of the oxides, at most 18% of $SiO_2$.

6. The refractory product according to claim 1, which contains, as percentages by weight on the basis of the oxides, at least 50% and at most 80% of $Al_2O_3$.

7. The refractory product according to claim 1, wherein a sum of the $Al_2O_3$, $SiO_2$, $ZrO_2$ and $Cr_2O_3$ contents is 94% or more, as percentages by weight on the basis of the oxides.

8. The refractory product according to claim 1, which contains, as a percentage by weight on the basis of the oxides, less than 0.5% of MgO.

9. The refractory product according to claim 1, which is manufactured according to a manufacturing process comprising the consecutive steps of:
   a) preparing an appropriate starting charge,
   b) casting said charge in a mold or compacting said charge by vibrating and/or pressing and/or tamping said charge within the mold to form a preform,
   c) removing said preform from the mold,
   d) drying said preform,
   e) firing said preform in an oxidizing atmosphere at a temperature in the range 1300 to 1800° C.

10. The refractory product according to claim 1, which is sintered before being placed in its operational position.

11. The refractory product according to claim 1, including more than 99%, by weight, of the oxides.

12. The refractory product according to claim 1, containing no metal silicon and/or no metal fibers.

13. The refractory product according to claim 1, in which the grain size of mullite-zirconia lies in the range 0 to 3 mm.

14. The refractory product according to claim 1, containing, as percentages by weight on the basis of the oxides, at least 3% and less than 22% of mullite-zirconia grains having a size of 0.7 mm or less.

15. The refractory product according to claim 1, containing less than 1% by weight of MgO, on the basis of the oxides.

16. The refractory product according to claim 1, which is already sintered before being placed in its operational position or installed.

17. The refractory product according to claim 3, which contains, as percentages by weight on the basis of the oxides, at least 10% and at most 33% of $ZrO_2$.

18. The refractory product according to claim 3, which contains, as percentages by weight on the basis of the oxides, at most 18% of $SiO_2$.

19. The refractory product according to claim 3, which contains, as percentages by weight on the basis of the oxides, at least 50% and at most 80% of $Al_2O_3$.

20. The refractory product according to claim 17, which contains, as percentages by weight on the basis of the oxides, at most 18% of $SiO_2$.

21. The refractory product according to claim 17, which contains, as percentages by weight on the basis of the oxides, at least 50% and at most 80% of $Al_2O_3$.

22. The refractory product according to claim 20, which contains, as percentages by weight on the basis of the oxides, at least 50% and at most 80% of $Al_2O_3$.

23. The refractory product according to claim 1, which contains, as percentages by weight on the basis of the oxides, more than 19% and less than 50% of mullite-zirconia grains, at least 10% of $Zr_2O_2$ and less than 0.5% of MgO.

* * * * *